United States Patent
Abraham et al.

(10) Patent No.: US 9,155,101 B2
(45) Date of Patent: Oct. 6, 2015

(54) SYSTEMS AND METHODS FOR DYNAMIC ASSOCIATION ORDERING BASED ON SERVICE DIFFERENTIATION IN WIRELESS LOCAL AREA NETWORKS

(75) Inventors: Santosh Paul Abraham, San Diego, CA (US); George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 167 days.

(21) Appl. No.: 13/600,088

(22) Filed: Aug. 30, 2012

(65) Prior Publication Data

US 2014/0064245 A1    Mar. 6, 2014

(51) Int. Cl.
| | |
|---|---|
| *H04W 72/10* | (2009.01) |
| *H04W 48/20* | (2009.01) |
| *H04W 84/12* | (2009.01) |
| *H04W 88/08* | (2009.01) |

(Continued)

(52) U.S. Cl.
CPC .............. *H04W 72/10* (2013.01); *H04W 48/20* (2013.01); *H04W 84/12* (2013.01)

(58) Field of Classification Search
CPC ...... H04W 72/10; H04W 72/12; H04W 48/20
USPC ............ 370/230, 329, 331, 332, 343, 395.42, 370/311, 338; 455/435.3, 436–442, 452.1, 455/456.2–456.6, 517; 709/224–228, 240
See application file for complete search history.

(56) References Cited

U.S. PATENT DOCUMENTS

| | | |
|---|---|---|
| 7,136,361 B2 | 11/2006 | Benveniste |
| 7,245,946 B2 | 7/2007 | Liu |

(Continued)

FOREIGN PATENT DOCUMENTS

| | | |
|---|---|---|
| EP | 1126636 A2 | 8/2001 |
| EP | 1732265 A1 | 12/2006 |

(Continued)

OTHER PUBLICATIONS

International Search Report and Written Opinion—PCT/US2013/056134, International Search Authority—European Patent Office, Dec. 12, 2013.

(Continued)

*Primary Examiner* — Un C Cho
*Assistant Examiner* — Peian Lou
(74) *Attorney, Agent, or Firm* — S. Hossain Beladi (57) ABSTRACT

Embodiments relate to systems and methods for dynamic association ordering based on service differentiation in wireless local area networks. A WiFi™ or other access point can broadcast beacon information to surrounding stations, and receive probe requests from those stations seeking to associate with the access point. The access point can determine a classification for each station, depending on station attributes such as subscription status, handoff status, or others. Stations receiving a higher classification can enter the association process sooner than those with lower classifications. The association order can be managed by inserting a delay in the probe response, by broadcasting the classifications which will be processed in the next beacon interval, or by adjusting the order in which association steps will be performed. Stations having higher classifications can be associated more quickly than lower-classification stations, in contrast to conventional association techniques which handle probe requests in the order received.

48 Claims, 7 Drawing Sheets

(51) Int. Cl.
*H04W 88/12* (2009.01)
*H04W 72/12* (2009.01)
*H04W 16/10* (2009.01)
*H04W 28/02* (2009.01)
*H04W 28/08* (2009.01)
*H04W 52/02* (2009.01)

(56) References Cited

U.S. PATENT DOCUMENTS

| | | | |
|---|---|---|---|
| 7,894,405 B2 | 2/2011 | Zhun | |
| 2003/0002456 A1* | 1/2003 | Soomro et al. | 370/328 |
| 2005/0060319 A1 | 3/2005 | Douglas et al. | |
| 2006/0084377 A1 | 4/2006 | Lee et al. | |
| 2007/0127367 A1 | 6/2007 | Ogasahara et al. | |
| 2008/0069018 A1 | 3/2008 | Gast | |
| 2008/0170497 A1* | 7/2008 | Jeong et al. | 370/230 |
| 2009/0304008 A1 | 12/2009 | Kono et al. | |
| 2010/0260096 A1 | 10/2010 | Ulupinar et al. | |
| 2011/0013569 A1 | 1/2011 | Scherzer et al. | |
| 2011/0038480 A1 | 2/2011 | Lin | |
| 2011/0249609 A1 | 10/2011 | Brusilovsky et al. | |
| 2011/0305339 A1 | 12/2011 | Norrman et al. | |
| 2012/0051240 A1 | 3/2012 | Dwivedi et al. | |
| 2012/0113971 A1 | 5/2012 | Giaretta et al. | |
| 2012/0269141 A1* | 10/2012 | Ha | 370/329 |
| 2013/0235760 A1 | 9/2013 | Merlin | |
| 2013/0235788 A1 | 9/2013 | Abraham et al. | |
| 2013/0235789 A1 | 9/2013 | Abraham et al. | |
| 2013/0235790 A1 | 9/2013 | Abraham et al. | |
| 2013/0235791 A1 | 9/2013 | Abraham et al. | |
| 2013/0235792 A1 | 9/2013 | Abraham et al. | |
| 2013/0336196 A1 | 12/2013 | Abraham et al. | |
| 2014/0022902 A1* | 1/2014 | Uppunda et al. | 370/235 |

FOREIGN PATENT DOCUMENTS

| | | |
|---|---|---|
| GB | 2471486 A | 1/2011 |
| WO | 03096554 A2 | 11/2003 |
| WO | 2004032426 A1 | 4/2004 |
| WO | 2007046630 A2 | 4/2007 |
| WO | 2007047181 A2 | 4/2007 |
| WO | 2008045632 A1 | 4/2008 |

OTHER PUBLICATIONS

Zhu Y., et al., "A user-centric network management framework for high-density Wireless LANs", Integrated Network Management, 2009, IM '09. IFIP/IEEE International Symposium on, IEEE, Piscataway, NJ, USA, Jun. 1, 2009, pp. 218-225, XP031499101, ISBN: 978-1-4244-3486-2 the whole document.

SA3: "Living Document on Key Security Issues of Relay Node Architectures", 3GPP Draft; S3-101106-Clean, 3rd Generation Partnership Project (3GPP), Mobile Competence Centre; 650, Route Des Lucioles; F-06921 Sophia-Antipolis Cedex; France, vol. SA WG3, no. RIGA; 20100927, Oct. 7, 2010, XP050459845, [retrieved on Oct. 7, 2010].

Wei H-Y et al., "Two-Hop-Relay Architecture for Nextgeneration WWAN/WLAN Integration", IEEE Wireless Communications, IEEE Service Center, Piscataway, NJ, US, vol. 11, No. 2, Apr. 1, 2004, pp. 24-30, XP001196396, ISSN: 1536-1284, DOI: 10.1109/MWC.2004.1295734.

* cited by examiner

SYSTEMS AND METHODS FOR DYNAMIC ASSOCIATION ORDERING BASED ON SERVICE DIFFERENTIATION IN WIRELESS LOCAL AREA NETWORKS

FIELD

The present teachings relate to systems and methods for dynamic association ordering based on service differentiation in wireless local area networks, and more particularly, to platforms and techniques for prioritizing the association between a wireless station and an access point based on attributes of the requesting station.

BACKGROUND

In WiFi™ and other wireless local area networks (WLANs), a conventional arrangement for the association of a smart phone, computer, or other wireless device to a wireless router or other access point is to configure the access point to listen for all approaching stations wishing to associate themselves with the access point, and process those association requests in the order in which they are received However, this approach in known WiFi™ can entail some drawbacks. Those drawbacks include the fact that a first-in, first-out (FIFO) model for association requests takes no account of the relative priority of the subscribers or their data traffic. Thus, for instance, in a busy public network environment such as an airport, a user who initiates an association transaction to access a relatively low-priority data service may obtain a successful association with an access point, simply because that user's device was detected before a user having higher-priority service needs. This can be the case even if the time of initial contact between one station or device and the access point differs from the following station or device by only a moment. For instance, a user attempting to access an email account may have their association request serviced before that of a user who is in the middle of a streaming video download, even though interruption of a video or other media download may create greater disruption for that user than for the email user, simply because the email user's device generated a probe request before the video user, if only by a moment.

It may be desirable to provide methods and systems for dynamic association ordering based on service differentiation in wireless local area networks, in which the association event between a station and an access point can be prioritized and ordered according to the nature, priority, or importance of the service needs of the various users approaching or competing for wireless connections, based on a set of prioritization criteria designed to allow the highest-priority users to acquire a network connection at the soonest possible time.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for dynamic association ordering based on service differentiation in wireless local area networks. More particularly, embodiments relate to platforms and techniques for incorporating hardware, software, logic, and/or other resources in the access points and/or other platforms or nodes of a wireless local area network to allow the access points to carry out the association process between themselves and stations requesting association with those access points on a dynamically re-ordered basis, prioritizing the stations based on their service classification, hardware configuration, and/or other attributes. Stations having greater need for faster completion of the association process to the access point or points, such as stations receiving high-priority media, can therefore be scheduled for a quicker attachment to the access point, and begin to receive data access from the access point or points sooner than stations having less urgent or highly prioritized data or service needs.

Reference will now be made in detail to exemplary embodiments of the present teachings, which are illustrated in the accompanying drawings. Where possible the same reference numbers will be used throughout the drawings to refer to the same or like parts.

Figure 1:
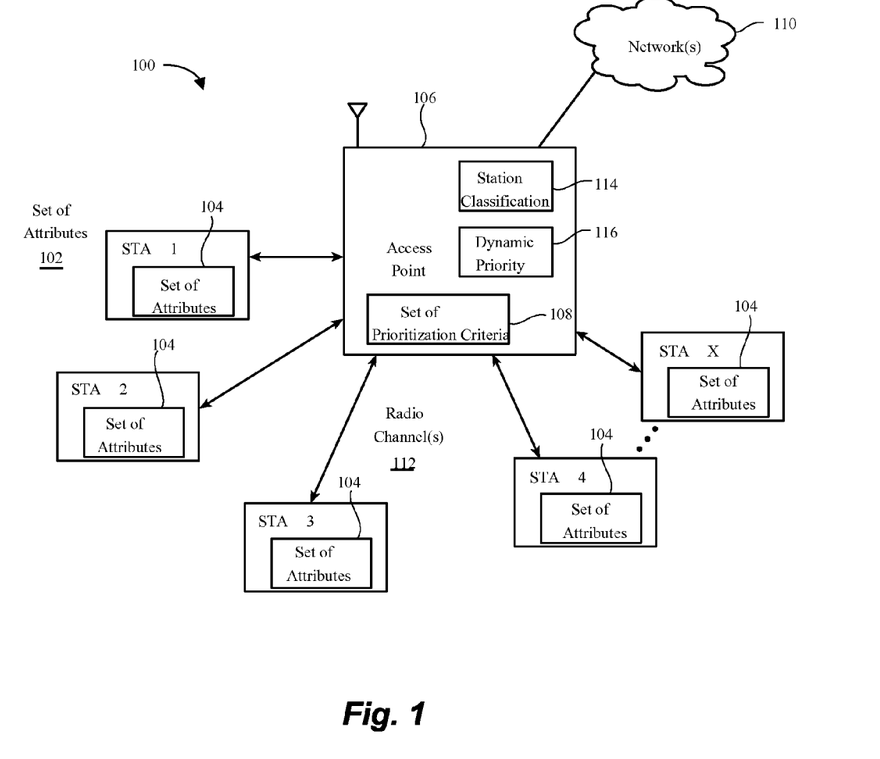
FIG. 1 illustrates an overall environment which can be used in systems and methods for dynamic association ordering based on service differentiation in wireless local area networks, according to various implementations.

FIG. 1 illustrates an environment 100 in which systems and methods for dynamic association ordering based on service differentiation in wireless local area networks can operate, according to aspects. In aspects as shown, a set of wireless devices 102 can communicate with an access point 106 via one or more radio connections 112. In aspects, the set of wireless devices 102 can include devices such as a cellular telephone, a smart phone, a portable computer, a tablet device, a media player device, a global positioning system (GPS) device, a personal digital assistant (PDA) device, and/or other network-enabled, mobile and/or wireless device or platform. In aspects, the one or more radio connections 112 can be or include one or more wireless connections or channels, such as, merely for example, a WiFi™ network operating under the Institute of Electrical and Electronics Engineers (IEEE) 802.11 family of standards. While a WiFi™ implementation of the network environment may be illustratively described, it will be appreciated that access point 106 can be or include other or additional wireless routers, switches, and/or other hardware, receivers, nodes, channels, and/or services capable of establishing a connection with the set of wireless stations 102 in a wireless local area network (WLAN) configuration.

At various times, and as likewise shown in FIG. 1, while in transit or at other times, one or more of the set of wireless devices 102 can enter the proximity of the access point 116. According to aspects, as noted the access point 106 can be or include a WiFi™ router with which the set of wireless devices 102 has reached, and/or is approaching, radio connection range via one or more radio channels 112. According to aspects, the access point 106 can detect and/or communicate with any one or more of the set of wireless devices 102 using a set of transmitted beacon information, and/or other signals. In aspects, the access point 106 can be configured to provide a data link to the one or more networks 110 for all wireless devices which have successfully associated with the access point 106, as described herein. In aspects, the one or more networks 110 can be or include the Internet and/or other public or private networks. The access point 106 can connect to the one or more networks 110 via wired or wireless links, optical and/or other high-speed connections, edge or core servers, and/or other transmission links or channels.

In aspects, the access point 106 can generate, access, and/or maintain station classification data 114 with which to assign a set of dynamic priority information 116 to one or more stations in the set of stations 102. In aspects, the access point 106 can generate, access, and/or maintain the station classification data 114 based on a set of attributes 104 associated with each of the stations in the set of stations 102. According to aspects, the set of attributes 104 can comprise several types of data characterizing each station and its configuration, including data related to the subscription status of the station.

For instance, the subscription status of a station can indicate the user identity and subscription level, class, tier, and/or type. The subscription status can include information indicating or identifying subscribed services, plans, payment arrangements, media types, data rates, data download allowances, radio frequency bands, and/or quality of service (QoS) levels for which the user of the station has subscribed. In implementations, the subscription status can likewise or instead comprise service features such as guaranteed or minimum uptime levels, failover services, data redundancy features, and/or other plans, levels, or services. In implementations, for further instance, a user's subscription plan to a broadband wireless data service or other service may be classified into levels such as levels designated as bronze, silver, gold, and/or platinum levels of service. It will be appreciated, however, that other types, numbers, and/or designations for different service tiers can be used. In aspects, different tiers or designations can be applied or identified by the service provider to which the user has subscribed, and/or can be generated or identified by other entities, such as an online service provider, which may be accessed to retrieve some or all of the set of attributes 104 for instance by the access point 106. In aspects, the set of attributes 104 can also comprise data regarding the hardware and/or software configuration of a station, including the number of antennas, power and/or SNR rating, WiFi™ version, other software or service versions, and/or other attributes of the hardware, software, and/or service resources of the station.

According to aspects, the set of attributes 104 can likewise comprise data related to the proximity, location, speed, direction, and/or other geospatial variables related to the station and/or the access point 106. In implementations, the position, proximity, and/or other information can be derived from global positioning system (GPS) data that may be generated in the smart phone and/or other station device, but can also be derived from cellular geographic assignments, cellular triangulation, and/or other geospatial techniques or services.

In aspects, the set of attributes 104 can also include data related to the handover or handoff status of the station, as it approaches or reaches the range of the one or more radio channels 112 of the access point 106. That is, for stations in the set of stations 102 which are transitioning or about to transition from a cellular or other wireless wide area network (WWAN) to the wireless local area network (WLAN) supported by the access point 106, data may be collected from the station or about the station indicating that the station device currently has a WWAN data link that will be transitioned to a WLAN link via the access point 106. In cases, stations which are anticipating a handover event may be afforded a higher priority than stations which are not requesting a handoff, or which have no active data link via WWAN channels.

According to aspects, in general the access point 106 can generate and/or update the set of dynamic priority information 116 by accessing, receiving, generate, analyzing, and/or otherwise manipulating or operating on the station classification data 114 using the set of prioritization criteria 108. In aspects, the set of prioritization criteria 108 can be or include a set of rules, tests, thresholds, computations, and/or other logic to assign or weight the priority of each station in the set of stations 102 for purposes of carrying out the association process between the station and the access point 106. In aspects, the set of prioritization criteria 108 can be adjustable and/or updateable, and can assign higher priority based on one or more attributes reflected in the set of attributes 104 of a station, independently or in combination with other attributes. In implementations, the set of dynamic priority information 116 can be encoded in a scale or range, for instance, a scale or rating of 1 to 10, with a rating of 1 being the highest available priority rating. In such instances or others, a station whose user has subscribed to the highest or premium type of service may be assigned a high value in the set of dynamic priority information 116, for instance 1 or 2, while a user who has subscribed to a basic set of data services can be assigned a relatively lower priority rank, such as 6 or 7. In aspects, a station which is located in close proximity to the access point 106 can be assigned a relatively higher priority rating than a station which is comparatively distance, while as noted a station which is requesting or experiencing a data link handover event may likewise be assigned a high priority rating, such as 1 or 2 on a scale of 10. In implementations, various attributes or factors can be combined for each station, to generate an aggregate or final priority rating, such as by multiplying ratings for multiple attributes together. It will be appreciated however that various rating, scaling, and/or combination techniques or computations can be used to generate the set of dynamic priority information 116. In aspects, the set of dynamic priority information 116 can be or include a list of all stations in the set of stations 102 in order of their priority rank, but other formats for the set of dynamic priority information 116 and/or associated data can be used. Upon generation of the set of dynamic priority information 116, the access point 106 and/or other platform, device, logic, and/or service can alter or adjust the timing or ordering of the association process between the set of stations 102 and the access point 106, to create a dynamic, out-of-turn, and/or otherwise differentiated sequence or timing for the association or attachment of each station in the set of stations 102 to the access point 106.

Figure 2:
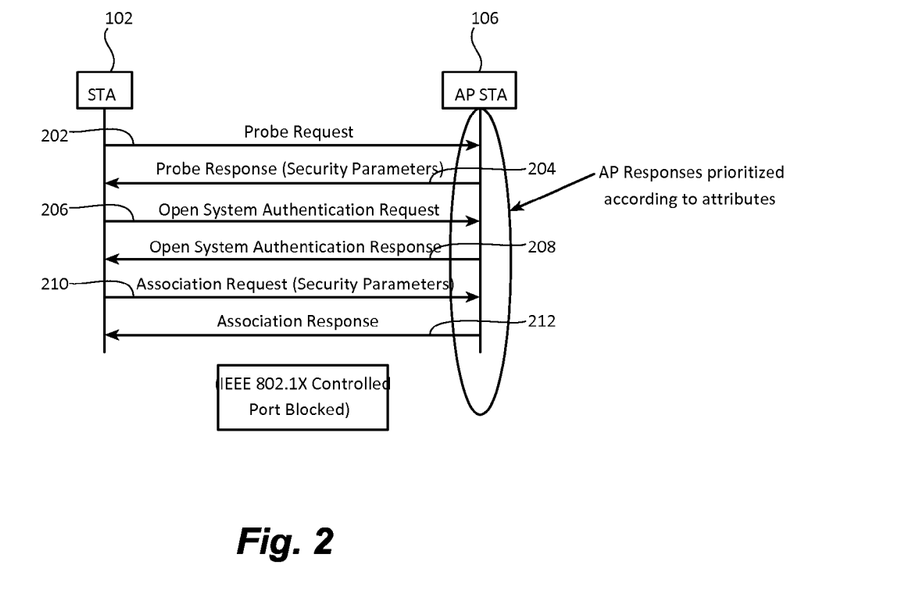
FIG. 2 illustrates a state diagram for the data exchanges that can take place between a station and an access point during the association process, according to various embodiments.

In implementations, the association process used to connect or attach each station to the access point 106 can follow the flow diagram shown in FIG. 2 for IEEE 802.11 transactions, although it will be understood that other association protocols, formats, and/or standards can be used. As shown in that figure, an association sequence between one or more stations in the set of stations 102 and the access point 106 can be initiated in 202 by the receipt of a probe request from the station by the access point 106. In 204, the access point 106 can respond to the probe request by transmitting a probe response. In 206, the station transmit can open system authentication request which is transmitted to the access point 106. The access point 106 can access an authentication server and/or other authority, and in 208 can transmit an open system authentication response to the requesting station, based on the results of the authentication process. In 210, the requesting station can transmit an association request, including security parameters, to the access point 106. In 212, the access point 106 can response with an association response 212 to the requesting station, which when authentication requirements are met, can initiate a data link to the access point 106 and/or the one or more networks 110. It may be noted that in one or more of the foregoing association exchanges, one or more ports operating under the IEEE 802.11 or other ports can be blocked or controlled by the access point 106. Before, during, and/or after the association process depicted in FIG. 2, the access point 106 can operate to control the order in which communications between the requesting station or stations and the access point 106 are carried out, to control the scheduling or order in which data link connections by the various stations to the one or more networks 110 are established. According to aspects, the access point 106 can alter or manage the sequence and/or content one or more of the association exchanges and/or other processes to produce a dynamic ordering of station associations.

Figure 3A:
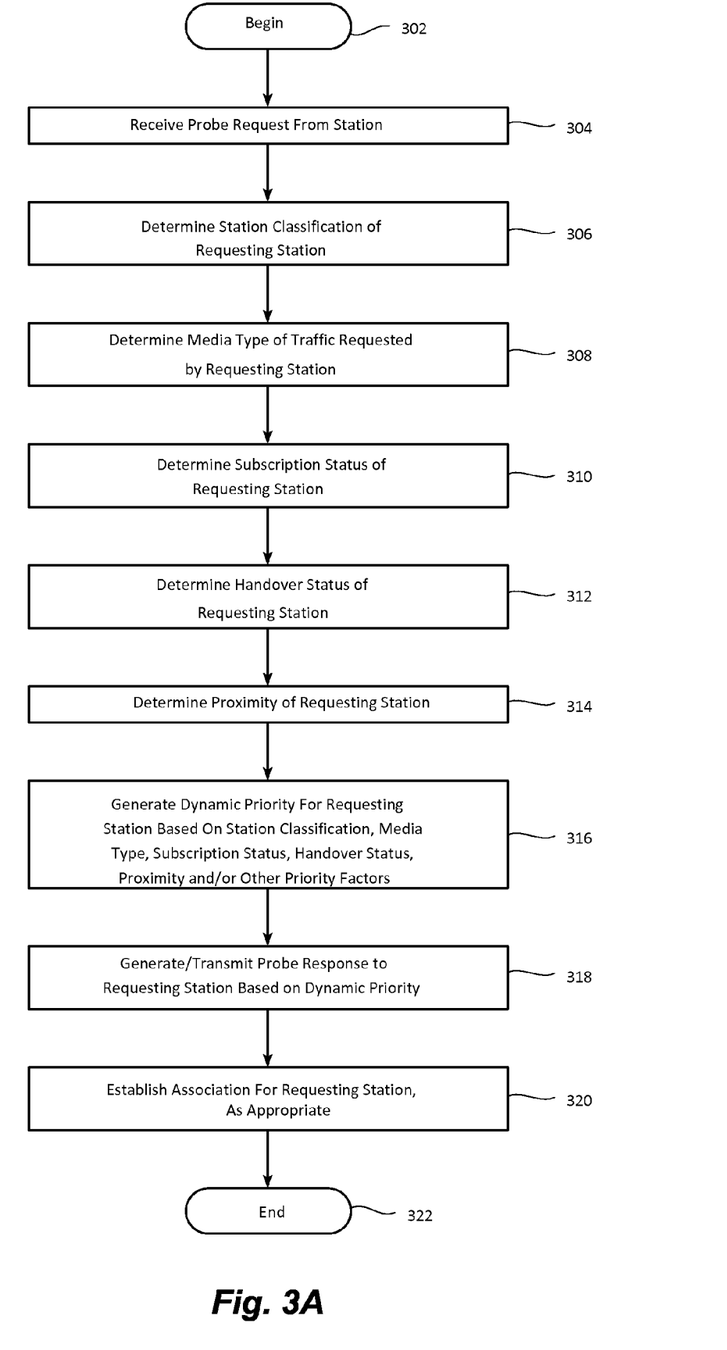
FIG. 3A illustrates a flowchart of processing that can be used to adjust the probe request sequence to dynamically adjust association order, according to various embodiments.

In implementations, and as for instance shown in FIG. 3A, the access point 106 can adjust the timing of the probe request transaction between the requesting station and the access point 106, to generate a dynamically ordered schedule by which stations will become associated with the access point 106 based on priority. In 302, processing can begin. In 304, the access point 106 can receive a probe request from a requesting station in the set of stations 102. In 306, the access point 106 can determine an initial station classification 114 of the requesting station, for instance, based on recorded characteristics or attributes of the requesting station. In 308, the access point 106 can determine a media type of the traffic requested by the requesting station, such as, merely for example, a video or audio stream, an email connection, a chat or other messaging channel, and/or others. In 310, the access point 106 can determine a subscription status of the requesting station and/or associated user, for instance to identify the user as a basic, midrange, or premium cellular or data subscriber, a subscriber whose account requires roaming charges, and/or other subscription or plan features. In 312, the access point 106 can determine the handover status of the requesting station, including whether the station is requesting the continuation or replacement of a data link via a WWAN and/or other network or channel. In 314, the access point 106 can determine the proximity of the requesting station to the access point 106, and/or other position or geospatial data related to the requesting station. In 316, the access point 106 can generate a dynamic priority 116 for the requesting station, based on data which can include the station classification 114, the requested media type, the identified subscription status, the handover status of the station, the proximity of the station to the access point 106, and/or other priority factors. In 318, the access point 106 can generate and/or transmit a probe response to the requesting station based on the dynamic priority 116 developed for that station. In 320, the access point 106 can establish an association for the requesting station, as appropriate. For instance, the requesting station can be allocated a channel or connection, such as a TCP/IP (Transfer Control Protocol/Internet Protocol) connection, to the one or more networks 110. In 322, processing can repeat, return to a prior processing point, jump to a further processing point, or end.

Figure 3B:
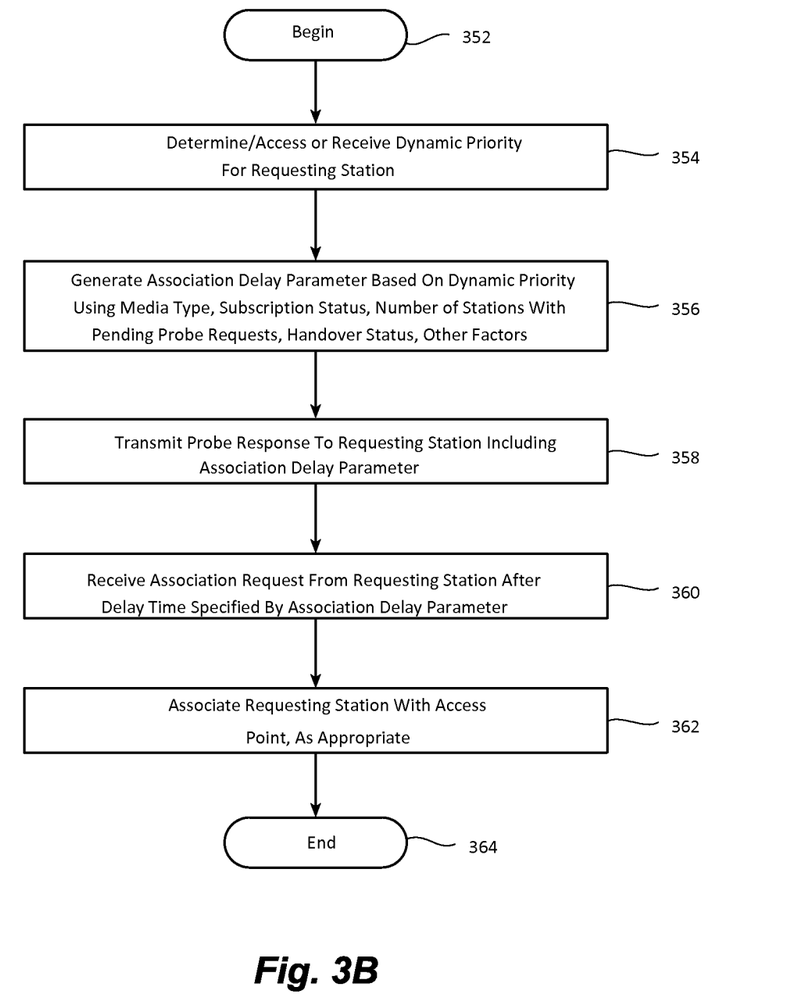
FIG. 3B illustrates a flowchart of processing that can be used to adjust the probe request transaction using an embedded delay parameter, according to various embodiments.

According to aspects, and as for example shown in FIG. 3B, besides using the probe request transactions illustrated in FIG. 3A to re-order the association process, the access point 106 can in addition or instead introduce a delay factor or parameter to that process in order to adjust the order of association of requesting stations. As aspects as shown, in 352 processing can begin. In 354, the access point 106 can access, determine, and/or receive the dynamic priority 116 for the requesting station. In 356, the access point 106 can generate an association delay parameter based on or type, tier, and/or level using the media type, subscription status, number of stations with pending probe requests, handover status, and/or other factors, variables, and/or criteria. In 358, the access point 106 can transmit a probe response to the requesting station including the association delay parameter. In aspects, the association delay parameter can encode or indicate the amount of time which the requesting station should or must wait before initiating an association request, and/or taking other actions to acquire an association with the access point 106. In 360, the access point 106 can receive an association request from the requesting station after the delay time specified by or in the association delay parameter. In 362, the access point 106 can associate the requesting station with or to the access point 106, as appropriate. In 364, processing can repeat, return to a prior processing point, jump to a further processing point, or end.

Figure 4:
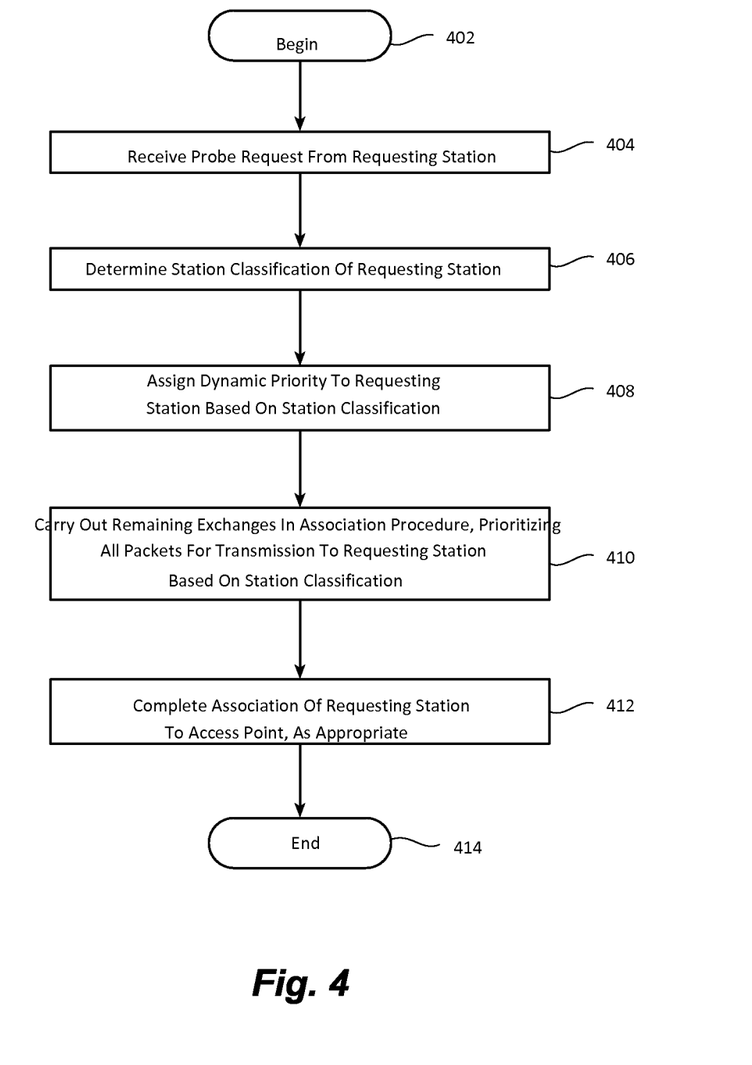
FIG. 4 illustrates a flowchart of processing that can be used to manage the association transaction to adjust association order in dynamic association ordering based on service differentiation in wireless local area networks, according to various embodiments.

In implementations, and as for example illustrated in FIG. 4, in addition to or instead of management of the probe request transaction between the requesting station and the access point 106, the access point 106 can generate a dynamic ordering of the association process by changing the timing or sequence of the association request packets themselves. In 402, processing can begin. In 404, the access point 106 can receive a probe request form a requesting station. In 406, the access point 106 can determine the station classification 114 of the requesting station, based on the set of attributes 104 of the requesting station and/or other data. In 408, the access point 106 can assign a dynamic priority 116 to the requesting station based on the station classification 114 and/or other data. In 410, the access point 106 can carry out the remaining exchanges in the association procedure, prioritizing all packets for transmission to the requesting station based on the station classification 114 and/or dynamic priority 116. In aspects, the access point 106 can for example execute the association transaction specified by the IEEE 802.11 WiFi™ standard with the packets sent by the access point 106 prioritized to first transmit all response packets associated with the highest-priority station first, after which all packets associated with the next-highest priority station next, and so forth. In 412, the access point 106 can complete the association of the requesting station to the access point 106, as appropriate. In 414, processing can repeat, return to a prior processing point, jump to a further processing point, or end.

Figure 5:
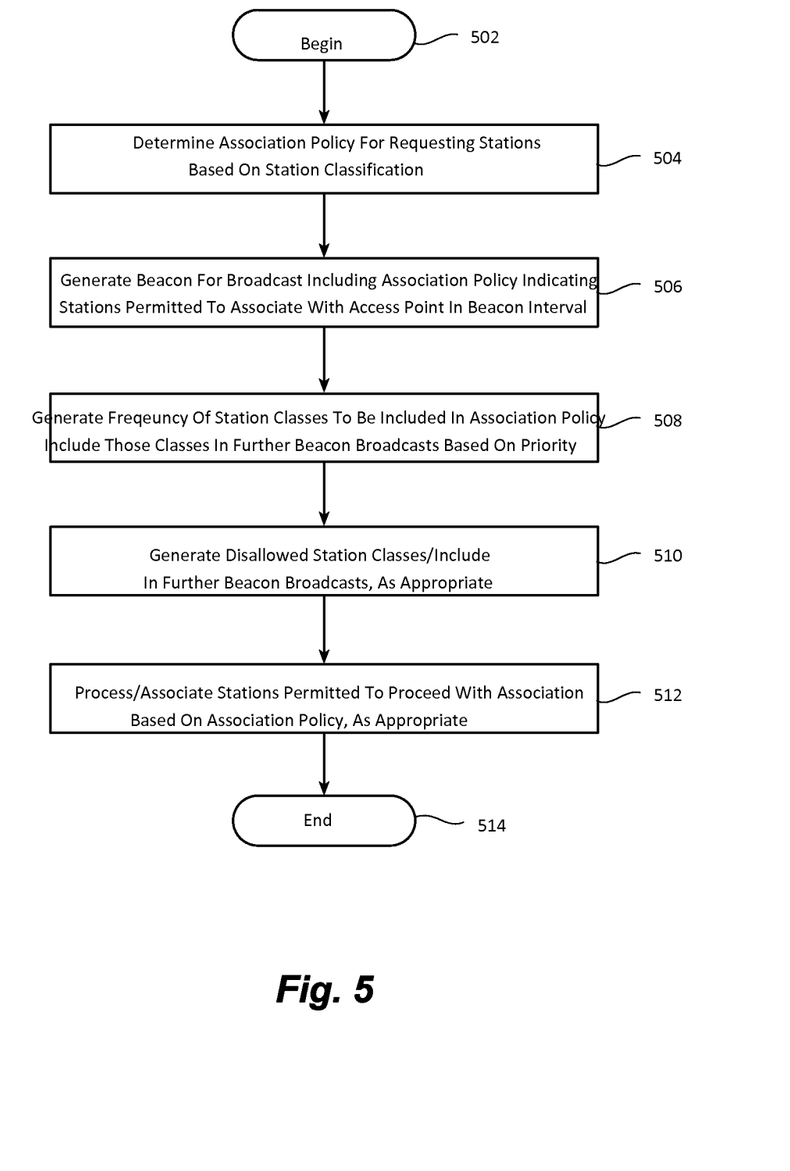
FIG. 5 illustrates a flowchart of processing that can be used to manage beacon broadcast operations in dynamic association ordering based on service differentiation in wireless local area networks, according to various embodiments.

In implementations, in addition to or instead of the preceding techniques for dynamically differentiation and/or ordering the association of the stations in the set of stations 102, the access point 106 can manage the ordering or sequencing of station associations by controlling a set of beacon information broadcast by the access point 106. In aspects as shown, in 502, processing can begin. In 504, the access point 106 can determine an association policy for requesting stations in the set of stations 102, based on the station classification 114 for those stations. In aspects, the association policy can record or encode those classes of station which will receive highest priority for association purposes, and which will be permitted to initiate the association process with the access point 106 during the following beacon interval. The association policy can also indicate those classes of stations having lower priority. The association policy can be encoded to be broadcast to the set of stations 102 within the set of beacon information transmitted by the access point 106, on a regular or other basis. In 506, the access point 106 can generate a frequency for one or more station classes to be allowed to initiate an association in the set of beacon information broadcast by the access point 106 over the one or more radio channels 112. For instance, classes of stations which are of the highest priority may be identified in each beacon broadcast as being permitted to initiate an association transaction within each following beacon interval, while stations of lower classification may be identified only in every fifth or tenth beacon broadcast. Other frequencies can be used. In 512, the access point 106 can process and/or associate the stations permitted to proceed with an association transaction based on the association policy, the broadcast association policy, and/or other data, as appropriate. In 514, processing can repeat, return to a prior processing point, jump to a further processing point, or end.

Figure 6:
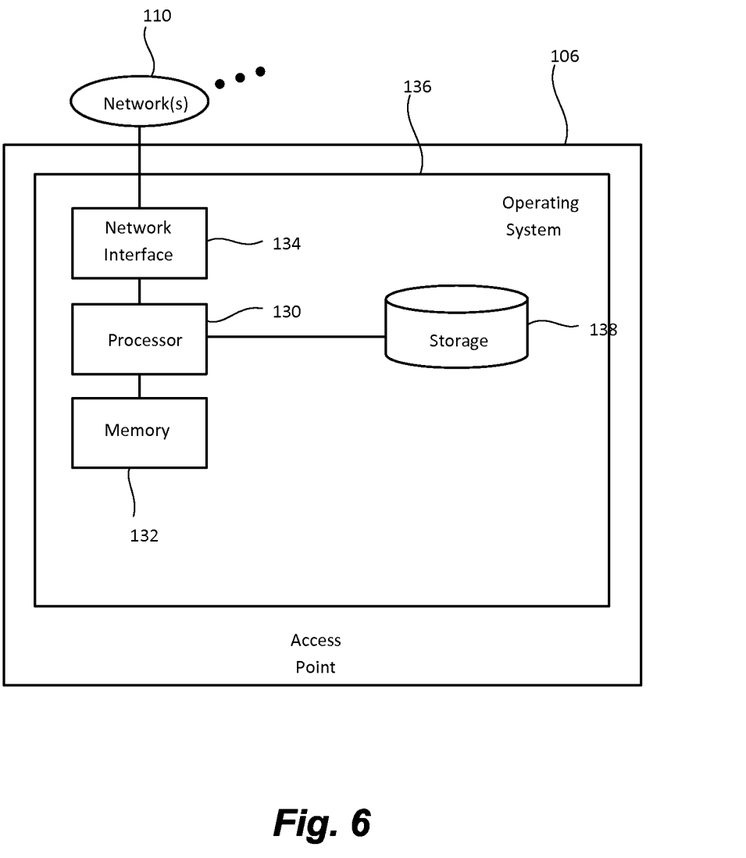
FIG. 6 illustrates exemplary hardware, software, and other resources that can be used in dynamic association ordering based on service differentiation in wireless local area networks, according to various embodiments.

FIG. 6 illustrates various hardware, software, and other resources that can be used in implementations of dynamic association ordering based on service differentiation in wireless local area networks, according to embodiments. In embodiments as shown, the access point 106 can comprise a platform including processor 130 communicating with memory 132, such as electronic random access memory, operating under control of or in conjunction with an operating system 136. The processor 130 in embodiments can be incorporated in one or more microprocessors, servers, clusters, and/or other computers or hardware resources, and/or can be implemented using cloud-based resources. The operating system 136 can be, for example, a distribution of the Linux™ operating system, the Unix™ operating system, or other open-source or proprietary operating system or platform. The processor 130 can communicate with storage 138, such as a database stored on a local hard drive or drive array, to access or store information including the set of attributes 104, set of dynamic priority information 116, and/or subsets of selections thereof, along with other content, media, or other data. The processor 130 can further communicate with a network interface 134, such as an Ethernet or wireless data connection, which in turn communicates with the one or more networks 110, such as the Internet or other public or private networks. The processor 130 can, in general, be programmed or configured to execute control logic and to control various processing operations, including to generate the dynamic priority 116 and other information related to the ordering of the association process for various stations, on a differentiated basis. In aspects, the stations in the set of stations 102 can be or include resources similar to those of the access point 106, and/or can include additional or different hardware, software, and/or other resources. Other configurations of the access point 106, the set of stations 102, associated network connections, and other hardware, software, and service resources are possible.

The foregoing description is illustrative, and variations in configuration and implementation may occur to persons skilled in the art. For example, while implementations have been described in which a single access point 106 interacts with the set of stations 102, in implementations, two or more access points can interact with the set of stations 102 and dynamically order the association process for one or more stations. Similarly, while implementations have been described in which the access point 106 may employ one technique or parameter to adjust the sequencing of the association process, in other implementations, multiple techniques or parameters can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of associating a station with an access point, comprising:
    determining, at an access point based on a request for an association transaction between a station and the access point, a set of attributes associated with the station, the request for the association transaction comprising association policy information identifying a first station class permitted to associate with the access point and a second station class permitted to associate with the access point;
    accessing a set of prioritization criteria;
    determining a station priority for the station based on the set of attributes associated with the station and based on the set of prioritization criteria; and
    scheduling, by the access point based on the station priority relative to a second station priority associated with a second station, an order in which to conduct:
        a first association transaction exchange for the station to associate the station with the access point, relative to
        a second association transaction exchange for the second station to associate the second station with the access point.

2. The method of claim 1, wherein the request for the association transaction comprises a probe request.

3. The method of claim 1, wherein the request for the association transaction comprises an authentication request.

4. The method of claim 1, wherein the request for the association transaction comprises an association request, and wherein the scheduling of the association transaction exchange comprises comparing the station priority to the second station priority.

5. The method of claim 1, wherein the request for the association transaction comprises a beacon transmission that includes the association policy information identifying the first and second station classes permitted to associate with the access point during a beacon interval associated with the beacon transmission.

6. The method of claim 1, wherein the scheduling of the association transaction exchange comprises scheduling a probe response based on the station priority.

7. The method of claim 1, wherein the scheduling of the association transaction exchange comprises scheduling an authentication response based on the station priority.

8. The method of claim 1, wherein the scheduling of the association transaction exchange comprises scheduling an association response based on the station priority.

9. The method of claim 1, wherein the set of attributes associated with the station comprises at least one of:
    a subscription status of the station;
    a set of station configuration data for the station;
    a proximity of the station to the access point; or
    a handoff status of the station.

10. The method of claim 9, wherein the set of attributes associated with the station comprises the subscription status of the station, and wherein the subscription status of the station comprises at least one of:
- a subscription tier,
- a quality of service tier,
- a data rate tier,
- a data allowance tier, or
- a minimum uptime tier.

11. The method of claim 1, wherein the station priority is an aggregate priority rating based on a plurality of attributes of the set of attributes associated with the station.

12. The method of claim 1, wherein the request for the association transaction comprises a beacon transmission of a plurality of beacon transmissions, further comprising:
- determining a first number of the plurality of beacon transmissions in which to include association policy information identifying the first station class as being permitted to associate with the access point, and
- determining a second number of the plurality of beacon transmissions in which to include association policy information identifying the second station class as being permitted to associate with the access point.

13. A system, comprising:
- a wireless interface to facilitate communication between a station and an access point; and
- a processor configured to communicate with the station via the wireless interface, the processor being further configured to:
  - initiate a request for an association transaction between the station and the access point, the request for the association transaction comprising association policy information identifying a first station class permitted to associate with the access point and a second station class permitted to associate with the access point,
  - determine a set of attributes associated with the station,
  - access a set of prioritization criteria for use by the access point,
  - determine a station priority for the station based on the set of attributes associated with the station and on the set of prioritization criteria, and
  - schedule, based on the station priority relative to a second station priority associated with a second station, an order in which to conduct:
    - a first association transaction exchange for the station to associate the station with the access point, relative to
    - a second association transaction exchange for the second station to associate the second station with the access point.

14. The system of claim 13, wherein the request for the association transaction comprises a probe request.

15. The system of claim 13, wherein the request for the association transaction comprises an authentication request.

16. The system of claim 13, wherein the request for the association transaction comprises an association request, and wherein the processor is configured to schedule the association transaction exchange based on comparing the station priority to the second station priority.

17. The system of claim 13, wherein the request for the association transaction comprises a beacon transmission including the association policy information identifying the first and second station classes permitted to associate with the access point during a beacon interval associated with the beacon transmission.

18. The system of claim 13, wherein the scheduling of the association transaction exchange comprises scheduling a probe response based on the station priority.

19. The system of claim 13, wherein the scheduling of the association transaction exchange comprises scheduling an authentication response based on the station priority.

20. The system of claim 13, wherein the scheduling of the association transaction exchange comprises scheduling an association response based on the station priority.

21. The system of claim 13, wherein the set of attributes associated with the station comprises at least one of:
- a subscription status of the station;
- a set of station configuration data for the station;
- a proximity of the station to the access point; or
- a handoff status of the station.

22. The system of claim 21, wherein the set of attributes associated with the station comprises the subscription status of the station, and wherein the subscription status of the station comprises at least one of:
- a subscription tier,
- a quality of service tier,
- a data rate tier,
- a data allowance tier, or
- a minimum uptime tier.

23. The system of claim 13, wherein the station priority is an aggregate priority rating based on a plurality of attributes of the set of attributes associated with the station.

24. The system of claim 13, wherein the request for the association transaction comprises a beacon transmission of a plurality of beacon transmissions, and wherein the processor is further configured to:
- determine a first number of the plurality of beacon transmissions in which to include association policy information identifying the first station class as being permitted to associate with the access point, and
- determine a second number of the plurality of beacon transmissions in which to include association policy information identifying the second station class as being permitted to associate with the access point.

25. A system, comprising:
- means for interfacing a station and an access point; and
- means for scheduling an association transaction, the means for scheduling the association transaction being configured to:
  - communicate with the station via the means for interfacing,
  - initiate a request for an association transaction between the station and the access point, the request for the association transaction comprising association policy information identifying a first station class permitted to associate with the access point and a second station class permitted to associate with the access point,
  - determine a set of attributes associated with the station,
  - access a set of prioritization criteria for use by the access point,
  - determine a station priority for the station based on the set of attributes associated with the station and on the set of prioritization criteria, and
  - schedule, based on the station priority relative to a second station priority associated with a second station, an order in which to conduct:
    - a first association transaction exchange for the station to associate the station with the access point, relative to
    - a second association transaction exchange for the second station to associate the second station with the access point.

26. The system of claim 25, wherein the request for the association transaction comprises a probe request.

27. The system of claim 25, wherein the request for the association transaction comprises an authentication request.

28. The system of claim 25, wherein the request for the association transaction comprises an association request, and wherein the means for scheduling the association transaction exchange is configured to schedule the association transaction exchange based on comparing the station priority to the second station priority.

29. The system of claim 25, wherein the request for the association transaction comprises a beacon transmission including the association policy information identifying the first and second station classes permitted to associate with the access point during a beacon interval associated with the beacon transmission.

30. The system of claim 25, wherein the scheduling of the association transaction exchange comprises scheduling a probe response based on the station priority.

31. The system of claim 25, wherein the scheduling of the association transaction exchange comprises scheduling an authentication response based on the station priority.

32. The system of claim 25, wherein the scheduling of the association transaction exchange comprises scheduling an association response based on the station priority.

33. The system of claim 25, wherein the set of attributes associated with the station comprises at least one of:
a subscription identifier for the station;
a set of station configuration data for the station;
a proximity of the station to the access point; or
a handoff status of the station.

34. The system of claim 33, wherein the set of attributes associated with the station further comprises a subscription status of the station, and wherein the subscription status comprises at least one of:
a subscription tier,
a quality of service tier,
a data rate tier,
a data allowance tier, or
a minimum uptime tier.

35. The system of claim 25, wherein the station priority is an aggregate priority rating based on a plurality of attributes of the set of attributes associated with the station.

36. The system of claim 25, wherein the request for the association transaction comprises a beacon transmission of a plurality of beacon transmissions, and wherein the means for scheduling the association transaction is further configured to:
determine a first number of the plurality of beacon transmissions in which to include association policy information identifying the first station class as being permitted to associate with the access point, and
determine a second number of the plurality of beacon transmissions in which to include association policy information identifying the second station class as being permitted to associate with the access point.

37. A computer program product, comprising:
a non-transitory computer-readable medium comprising instructions executable by a processor to cause the processor to perform operations comprising:
initiating a request for an association transaction between a station and an access point, the request for the association transaction comprising association policy information identifying a first station class permitted to associate with the access point and a second station class permitted to associate with the access point;
determining a set of attributes associated with the station;
accessing a set of prioritization criteria for use by the access point;
determining a station priority for the station based on the set of attributes associated with the station and on the set of prioritization criteria; and
scheduling, based on the station priority relative to a second station priority associated with a second station, an order in which to conduct:
a first association transaction exchange for the station to associate the station with the access point, relative to
a second association transaction exchange for the second station to associate the second station with the access point.

38. The computer program product of claim 37, wherein the request for the association transaction comprises a probe request.

39. The computer program product of claim 37, wherein the request for the association transaction comprises an authentication request.

40. The computer program product of claim 37, wherein the request for the association transaction comprises an association request, and wherein scheduling the association transaction exchange includes comparing the station priority to the second station priority.

41. The computer program product of claim 37, wherein the request for the association transaction comprises a beacon transmission including the association policy information identifying the first and second station classes permitted to associate with the access point during a beacon interval associated with the beacon transmission.

42. The computer program product of claim 37, wherein the scheduling of the association transaction exchange comprises scheduling a probe response based on the station priority.

43. The computer program product of claim 37, wherein the scheduling of the association transaction exchange comprises scheduling an authentication response based on the station priority.

44. The computer program product of claim 37, wherein the scheduling of the association transaction exchange comprises scheduling an association response based on the station priority.

45. The computer program product of claim 37, wherein the set of attributes associated with the station comprises at least one of:
a subscription identifier for the station;
a set of station configuration data for the station;
a proximity of the station to the access point; or
a handoff status of the station.

46. The computer program product of claim 45, wherein the set of attributes associated with the station further comprises a subscription status of the station, and wherein the subscription status comprises at least one of:
a subscription tier,
a quality of service tier,
a data rate tier,
a data allowance tier, or
a minimum uptime tier.

47. The computer program product of claim 37, wherein the station priority is an aggregate priority rating based on a plurality of attributes of the set of attributes associated with the station.

48. The computer program product of claim 37, wherein the request for the association transaction comprises a beacon transmission of a plurality of beacon transmissions, and wherein the operations further comprise:

determining a first number of the plurality of beacon transmissions in which to include association policy information identifying the first station class as being permitted to associate with the access point, and determining a second number of the plurality of beacon transmissions in which to include association policy information identifying the second station class as being permitted to associate with the access point.

\* \* \* \* \*